United States Patent
Park (10) Patent No.: US 9,188,934 B2
(45) Date of Patent: Nov. 17, 2015

(54) POWER SUPPLY APPARATUS, IMAGE FORMING APPARATUS HAVING THE SAME, AND METHOD THEREOF

(71) Applicant: Samsung Electronics Co., Ltd, Suwon-si, Gyeonggi-do (KR)

(72) Inventor: Jin-yun Park, Changwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/302,717

(22) Filed: Jun. 12, 2014

(65) Prior Publication Data

US 2015/0117891 A1    Apr. 30, 2015

(30) Foreign Application Priority Data

Oct. 30, 2013 (KR) .................. 10-2013-0130370

(51) Int. Cl.
  *G03G 15/00* (2006.01)
  *H02M 3/335* (2006.01)
  *H02M 1/00* (2007.01)

(52) U.S. Cl.
  CPC ............ *G03G 15/80* (2013.01); *G03G 15/5004* (2013.01); *H02M 3/33523* (2013.01); *H02M 2001/0025* (2013.01)

(58) Field of Classification Search
  CPC   G03G 15/80; G03G 15/0283; G03G 15/5004
  USPC ..................................... 399/88, 89
  See application file for complete search history.

(56) References Cited

U.S. PATENT DOCUMENTS

| | | | | |
|---|---|---|---|---|
| 4,504,139 | A | * | 3/1985 | Nozaki et al. ................... 399/88 |
| 5,621,630 | A | * | 4/1997 | Suzuki et al. ................... 363/71 |
| 6,026,257 | A | * | 2/2000 | Takami et al. .................. 399/66 |
| 6,963,701 | B2 | * | 11/2005 | Inukai ............................. 399/66 |
| 7,190,917 | B2 | * | 3/2007 | Suzumi et al. .................. 399/88 |
| 2005/0013626 | A1 | * | 1/2005 | Satoh et al. .................... 399/88 |
| 2006/0171730 | A1 | * | 8/2006 | Kitajima ......................... 399/66 |
| 2007/0059016 | A1 | * | 3/2007 | Sato et al. ....................... 399/88 |
| 2007/0212103 | A1 | * | 9/2007 | Kikuchi ........................... 399/88 |
| 2007/0248369 | A1 | * | 10/2007 | Izumi et al. ..................... 399/44 |
| 2007/0274736 | A1 | * | 11/2007 | Sato et al. ....................... 399/88 |
| 2008/0124103 | A1 | * | 5/2008 | Uchida et al. ................... 399/45 |
| 2008/0304843 | A1 | * | 12/2008 | Kosuge et al. .................. 399/50 |
| 2009/0052932 | A1 | * | 2/2009 | Sakata ............................ 399/88 |
| 2010/0247122 | A1 | * | 9/2010 | Hagiwara ....................... 399/44 |
| 2010/0272463 | A1 | * | 10/2010 | Inukai ............................. 399/88 |
| 2012/0045237 | A1 | * | 2/2012 | Aoki et al. ...................... 399/66 |
| 2012/0063795 | A1 | * | 3/2012 | Funatani ......................... 399/44 |

(Continued)

*Primary Examiner* — David Bolduc
(74) *Attorney, Agent, or Firm* — Staas & Halsey LLP (57) ABSTRACT

A power supply apparatus capable of outputting a predetermined voltage or a predetermined electrical current selectively is provided, including a voltage level setter to determine an output level of a voltage or an electrical current according to an external signal, a constant voltage feedback unit to correct an output value of the voltage level setter so as to output a constant voltage of the output level to a load terminal, a constant current feedback unit to maintain the external signal constantly and correct an output value of the voltage level setter so as to output a constant current of the output level to the load terminal, a switch to connect the voltage level setter with the constant voltage feedback unit or the constant current feedback unit selectively, and a controller to control the switch to output the constant voltage or the constant current selectively according to a state of the load terminal.

29 Claims, 8 Drawing Sheets

(56) References Cited

U.S. PATENT DOCUMENTS

| | | | |
|---|---|---|---|
| 2012/0230715 A1* | 9/2012 | Ogino et al. | 399/66 |
| 2013/0177328 A1* | 7/2013 | Fukuda et al. | 399/43 |
| 2013/0294792 A1* | 11/2013 | Hara et al. | 399/66 |
| 2014/0265552 A1* | 9/2014 | Maekawa et al. | 307/2 |
| 2014/0356005 A1* | 12/2014 | Sakamoto | 399/44 |

* cited by examiner

-600V INPUT

| OUTPUT CURRENT(μA) | STATE |
|---|---|
| $I_{out} \geq b$ | HH(HIGH TEMPERATURE AND HIGH HUMIDITY) |
| $a < I_{out} < b$ | NN(ROOM TEMPERATURE) |
| $I_{out} \leq a$ | LL(LOW TEMPERATURE AND LOW HUMIDITY) |

POWER SUPPLY APPARATUS, IMAGE FORMING APPARATUS HAVING THE SAME, AND METHOD THEREOF

CROSS-REFERENCE TO RELATED APPLICATIONS

This application claims priority under 35 U.S.C. §119 (a) from Korean Patent Application No. 10-2013-0130370, filed on Oct. 30, 2013, in the Korean Intellectual Property Office, the disclosure of which is incorporated herein by reference in its entirety.

BACKGROUND OF THE INVENTION

1. Field of the Invention

The present general inventive concept generally relates to a power supply apparatus and an image forming apparatus having the same, and more particularly, to a power supply apparatus capable of outputting a constant voltage or a constant current according to an environment surrounding an image former of an image forming apparatus, and an image forming apparatus having the same.

2. Description of the Related Art

An image forming apparatus is a device that performs generation, print, reception, and transmission of image data. Image forming apparatuses include printers, scanners, photocopiers, facsimile machines (fax), and multifunction peripherals that incorporate the functionality of multiple devices in one.

In the related art, an image forming apparatus supplies a high voltage to an image former using a high voltage power supply (HVPS) to form an image. The supplied high voltage is applied to the image former in a constant voltage control method or a constant current control method. At this time, there is an advantageous control method according to a surrounding environment such as a temperature or humidity.

When printing in an environment with a high temperature and high humidity, the constant voltage control method is preferably used to supply the high voltage to the image former to avoid an electrical current leakage around paper, which often occurs when the constant current control method is used in the same environment deteriorating image quality of a printout.

When printing in an environment with a low temperature and low humidity, since a voltage may be applied fluidly according to the load of paper or a roller, it is more advantageous to apply a high voltage to the image former in the constant current control method rather than the constant voltage control method.

However, since a power supplier of a conventional image forming apparatus supplies the high voltage to the image former by adopting only either the constant current control method or the constant voltage control method, but not both, it is impossible to form an image in a control method that can switch between the constant control method and the constant voltage method by taking into consideration of the surrounding environment.

Therefore, there is a need for an image forming apparatus having a power supply apparatus which has both constant voltage and constant current feedback circuits to provide an image former with the high voltage by sensing the surrounding environment to selectively apply a more advantageous control method.

SUMMARY OF THE INVENTION

The present general inventive concept provides a power supply apparatus and an image forming apparatus having the same, the power supply apparatus being capable of outputting a constant voltage or a constant current according to an environment surrounding an image former of the image forming apparatus.

Additional features and utilities of the present general inventive concept will be set forth in part in the description which follows and, in part, will be obvious from the description, or may be learned by practice of the general inventive concept.

Exemplary embodiments of the present general inventive concept overcome the above disadvantages and other disadvantages not described above. Also, the present general inventive concept is not required to overcome the disadvantages described above, and an exemplary embodiment of the present general inventive concept may not overcome any of the problems described above.

The foregoing and/or other features and utilities of the present general inventive concept are achieved by providing a power supply apparatus that senses a surrounding environment, selects a constant voltage control method or a constant current control method, switches to a feedback circuit, and outputs a constant current or a constant voltage selectively to an image former, and an image forming apparatus having the same.

The foregoing and/or other features and utilities of the present invention general inventive concept can also be achieved by providing a power supply apparatus capable of selectively outputting a predetermined voltage or a predetermined electrical current includes a voltage level setter to determine an output level of a voltage or an electrical current according to an external signal, a constant voltage feedback unit to correct an output value of the voltage level setter so as to output a constant voltage of the output level to a load terminal, a constant current feedback unit to maintain the external signal constantly and correct an output value of the voltage level setter so as to output a constant current of the output level to the load terminal, a switch to connect the voltage level setter with the constant voltage feedback unit or the constant current feedback unit selectively, and a controller to control the switch to output the constant voltage or the constant current selectively according to a state of the load terminal.

The power supply apparatus may further include a storage to store a mapping table including state information of the load terminal corresponding to a value of a voltage or an electrical current, which is output to the load terminal when a predetermined external signal is input.

The controller may determine the state information of the load terminal based on the mapping table, and output the constant current or the constant voltage to the load terminal according to the state information of the load terminal.

The voltage level setter may include a comparator to determine the output level by comparing an input voltage consistent with the external signal and a reference voltage.

The constant voltage feedback unit may correct the output value of the voltage level setter by changing a feedback voltage input to the comparator. The constant current feedback unit may maintain the input voltage consistent with the external signal, and correct the output value of the voltage level setter by changing a feedback voltage input to the comparator.

The external signal may be a pulse width modulation (PWM) control signal.

The foregoing and/or other features and utilities of the present general inventive concept may also be achieved by providing an image forming apparatus that includes a power supplier, an image former to form an image, and a controller to control the power supplier to supply a predetermined voltage or a predetermined electric current to the image former according to a state of the image former. The power supplier may include a voltage level setter to determine an output level of a constant voltage or a constant current according to an external signal, a constant voltage feedback unit to correct an output value of the voltage level setter so as to output a constant voltage of the output level to the image former, a constant current feedback unit to maintain the external signal constantly and correct an output value of the voltage level setter so as to output a constant current of the output level to the image former, and a switch to connect the voltage level setter with the constant voltage feedback unit or the constant current feedback unit selectively.

The image forming apparatus may further include a storage to store a mapping table including state information of the image former corresponding to a voltage or an electrical current which is output to the image former when a predetermined external signal is input.

The controller may determine the state information of the image former based on the mapping table, and output the constant current or the constant voltage to the image former according to the state information of the image former.

The voltage level setter may include a comparator to determine the output level by comparing an input voltage consistent with the external signal and a reference voltage. The constant voltage feedback unit may correct the output value of the voltage level setter by changing a feedback voltage input to the comparator.

The constant current feedback unit may maintain the input voltage consistent with the external signal, and correct the output value of the voltage level setter by changing a feedback voltage input to the comparator.

The image former may include an organic photoconducting cartridge (OPC), a charge roller to charge the OPC with negative charges, and a transfer roller to transfer toner stuck to the OPC onto paper, and the constant voltage or the constant current is applied to the charge roller or the transfer roller.

The state of the image former may be one of a first state of an environment higher than a predetermined temperature and humidity, a second state of an environment lower than the predetermined temperature and humidity, and a third state of an environment same as the predetermined temperature and humidity.

The external signal of the image form apparatus may be a pulse width modulation (PWM) control signal.

As described above, both a constant voltage feedback circuit and a constant current feedback circuit are provided, an environment surrounding the image former is sensed, and a high voltage is applied to the image former in a control method suitable for the environment so that users may acquire clear images that they want.

The foregoing and/or other features and utilities of the present general inventive concept may also be achieved by providing a power supply apparatus, comprising a voltage setter to determine an output level of a voltage of an electrical current according to an external signal, a constant voltage feedback circuit to apply a constant voltage to a load terminal based on a feedback voltage of the constant voltage feedback circuit, a constant current feedback unit to apply a constant current to the load terminal based on a feedback voltage of the constant current feedback unit, and a controller to selectively connect the voltage setter to one of the constant voltage feedback unit and the constant current feedback unit based on environmental conditions surrounding the load terminal.

The environmental conditions may include one of a first environment condition and a second environment condition according to a comparison of a measured voltage level of the load terminal and a reference voltage When the measured voltage level of the load terminal is higher than the reference voltage, the environmental conditions may include the first environment condition under which the controller connects the constant voltage feedback unit to the load terminal.

When the measured voltage level of the load terminal is lower than the reference voltage, the environmental conditions may include the second environment condition under which the controller connects the constant current feedback unit to the load terminal.

The first and the second environment conditions may be different in temperature and humidity surrounding the load terminal.

The foregoing and/or other features and utilities of the present general inventive concept may also be achieved by providing a method of supplying a predetermined constant voltage or a predetermined constant current from a power supplier to an image former of an image forming apparatus, and the method includes receiving a print command, determining a state of the image former upon receiving the print command, selectively applying one of constant voltage control and constant current control depending on the state of the image former, performing feedback control according to a level of constant voltage or a level of constant current measured in the image former corresponding to the selective application, and supplying a constant voltage or a constant current according to the feedback control.

The state of the image former may be determined by comparing voltage levels of a load terminal of the power supplier with pre-stored reference values.

The state of the image former may include a first state corresponding to a first environment condition and a second state corresponding to a second environment condition surrounding the load terminal according to the comparison.

The first and the second environment conditions may be different in temperature and humidity surrounding the load terminal.

In the method of supplying a predetermined constant voltage or a predetermined constant current, the feedback control may correct an output voltage based on the output voltage and a feedback voltage.

The feedback control according to a level of constant voltage is performed separately from the feedback control according to a level of constant current.

The feedback control according to a level of constant voltage and the feedback control according to a level of constant current may be switchable between each other.

The method of supplying a predetermined constant voltage or a predetermined constant current may also include setting a level of constant voltage or constant current by a voltage level setter of the power supplier according to an external signal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
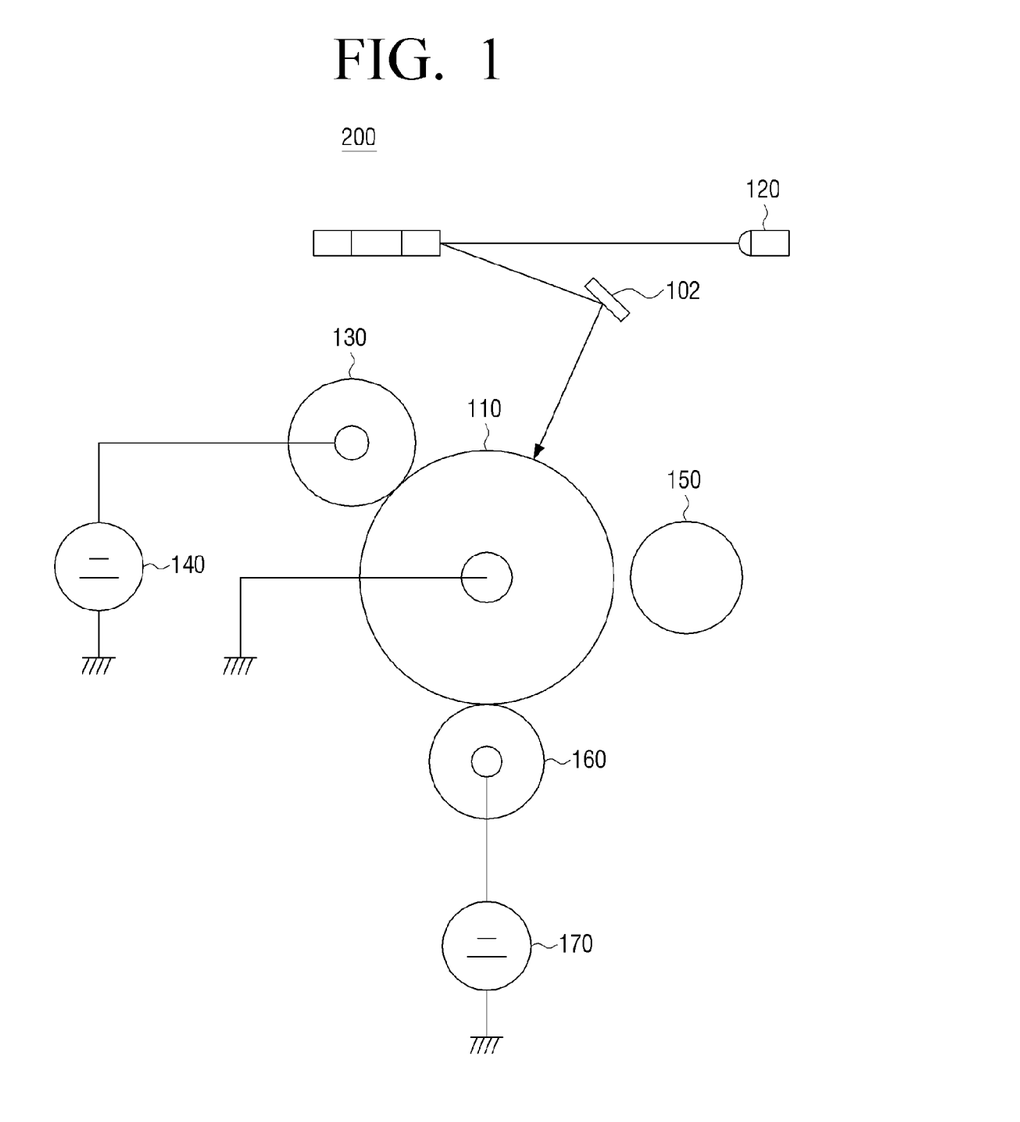
FIG. 1 illustrates operation of an image forming apparatus according to an exemplary embodiment of the present general inventive concept.

FIG. 1 illustrates operation of an image forming apparatus 200 according to an exemplary embodiment of the present general inventive concept.

The image forming apparatus 200 according to FIG. 1 may include an organic photoconducting cartridge (OPC) 110, a light source 120, a charge roller 130, a charge voltage supplier 140, a developer roller 150, a transfer roller 160, and a transfer voltage supplier 170.

When the image forming apparatus 200 receives a print data, a printer controller (not illustrated) divides the print data into 0 and 1 and determines where to shoot a laser so that the light source 120 shoots the laser towards a scanning mirror 102 having a hexagonal or tetragonal shape, but the scanning mirror 102 shape is not limited thereto.

The mirror 102 is provided on a polygon motor (not illustrated) that rotates clockwise. As the motor rotates, the mirror 102 moves and changes a reflection direction of the laser so that the laser may be diffused to a size of an image.

The laser emitted by the light source 120 arrives at the OPC 110. At this time, the entire OPC 110 has been charged with negative charges by the charge roller 130, and the voltage level at a portion of the OPC 110 that is in contact with the laser is down.

The charge roller 130 receives a high voltage from the charge voltage supplier 140 to charge the OPC 110 with negative charges. In order to apply the high voltage to the charge roller 130, the charge voltage supplier 140 outputs a constant current or a constant voltage.

The OPC 110 rotates by the motor. When one side of the mirror 102 turns back, a next line comes up.

Toner powder conveyed by the developer roller 150 carries negative charges. Due to a repulsive force between the negative charges, the toner powder does not stick to the OPC 110 except for the portion where the voltage level is reduced by contacting with the laser.

The toner powder stuck to the OPC 110 is then transferred to paper passing through the transfer roller 160 and the OPC 110, and is finally pressed and fixed onto the paper by high heat and high pressure.

The transfer roller 160 also receives a high voltage from the transfer voltage supplier 170 and moves the toner onto the paper. At this time, the transfer voltage supplier 170 applies the high voltage to the transfer roller 160 in a constant voltage control method or a constant current control method.

The constant voltage control method is a method in which a constant voltage is applied regardless of a load value of the transfer roller 160. The constant current control method is a method in which a high voltage is supplied by supplying a constant current.

However, since the load value of the transfer roller 160 changes according to environment conditions including temperature and humidity, which surround the transfer roller 160, the transfer voltage supplier 170 may not always apply the high voltage to the transfer roller 160. Accordingly, a feedback circuit may be included in the transfer voltage supplier 170 in order to constantly maintain the high voltage to apply to the transfer roller 160.

In FIG. 1, the charge voltage supplier 140 and the transfer voltage supplier 170 are provided separately, but it is also possible to supply power using a single voltage supplier.

Figure 2:
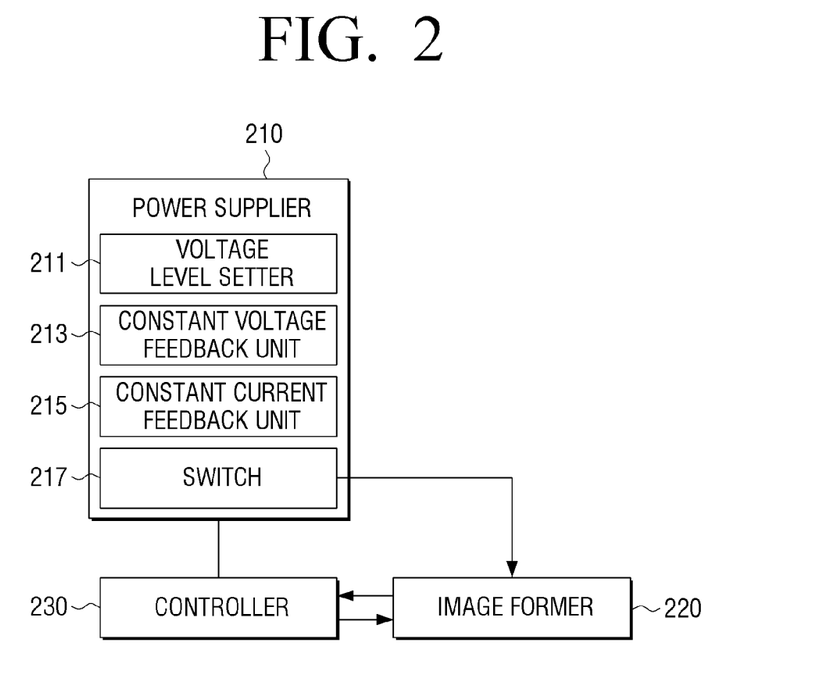
FIG. 2 illustrates an image forming apparatus capable of selectively switching between a constant current control method and a constant voltage control method according to an exemplary embodiment of the present general inventive concept.

FIG. 2 illustrates the image forming apparatus 200 capable of selectively switching between a constant current control method and a constant voltage control method according to an exemplary embodiment of the present general inventive concept.

The image forming apparatus 200 according to FIG. 2 may include a power supplier 210, an image former 220, and a controller 230. The power supplier 210 may include a voltage level setter 211, a constant voltage feedback unit 213, a constant current feedback unit 215, and a switch 217.

The power supplier 210 supplies a constant voltage or a constant current to the image former 220. More specifically, the voltage level setter 211 determines an output level of a constant voltage or a constant current according to an external signal, and generates a signal to supply a constant voltage or a constant current of the determined output level to the image former 220.

The external signal may be a pulse width modulation (PWM) control signal. More specifically, the voltage level setter 211 may set a level of constant voltage or a constant current be output to the image former 220 by outputting a specific value to a PWM input duty.

Since the output level set by the voltage level setter 211 may differ from the constant voltage or the constant current actually applied to the image former 220 according to a state of the image former 220 defined by a surrounding environment such as temperature and humidity, feedback control is performed according to a level of a constant voltage or a constant current actually measured in the image former 220.

To do so, the power supplier 210 includes the constant voltage feedback unit 213 and the constant current feedback unit 215.

On one hand, when the power supplier 210 outputs a high voltage to the image former 220 by supplying a constant voltage in the constant voltage control method, the constant voltage feedback unit 213 intervenes and corrects an output value of the voltage level setter 211 so as to apply a constant voltage of the output level determined by the voltage level setter 211 to the image former 220.

For example, when a voltage measured in the image former 220 is greater than an output value set by the voltage level setter 211, the constant voltage feedback unit 213 corrects the output value of the voltage level setter 211 to a lower value. When a voltage measured in the image former 220 is less than an output level set by the voltage level setter 211, the constant voltage feedback unit 213 corrects the output value of the voltage level setter 211 to a higher value.

On the other hand, when the power supplier 210 outputs a high voltage to the image former 220 by supplying a constant current in the constant current control method, the constant current feedback unit 215 intervenes and corrects an output value of the voltage level setter 211 so as to apply a constant current of the output level determined by the voltage level setter 211 to the image former 220.

In addition, the power supplier 210 includes the switch 217, which connects the voltage level setter 211 with the constant voltage feedback unit 213 or the constant current feedback unit 215, selectively.

The image former 220 receives power from the power supplier 210 and forms an image corresponding to the externally received data.

The controller 230 controls the power supplier 210 to supply a constant voltage or a constant current to the image former 220 according to the state of the image former 220.

When the image former 220 operates in an environment with a high temperature and high humidity, it is more advantageous to select the constant voltage control method over the constant current control method, as described above. Accordingly, the controller 230 controls the power supplier 210 to output a constant voltage, and controls the switch 217 to connect the voltage level setter 211 with the constant voltage feedback unit 213.

When the image former 220 operates in an environment with a low temperature and low humidity, it is more advantageous to select the constant current control method over the constant voltage method. Accordingly, the controller 230 controls the power supplier 210 to output a constant current, and controls the switch 217 to connect the voltage level setter 211 with the constant current feedback unit 215.

Figure 3:
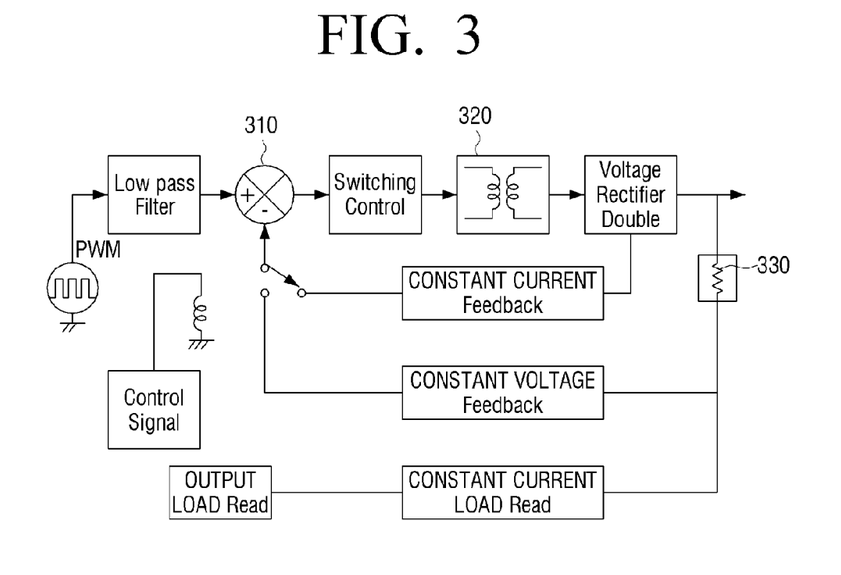
FIG. 3 is a detailed block diagram of a power supplier according to an exemplary embodiment of the present general inventive concept.

FIG. 3 is a detailed block diagram of the power supplier 210 according to an exemplary embodiment of the present general inventive concept.

Initially, the power supplier 210 operates in the constant current control method in which a control signal is input in a low state. The power supplier 210 inputs a constant PWM signal through a low pass filter in an initial non-image section, and controls a transformer 320 using a comparator 310. At this time, a primary side of the transformer 320 is switched so that a high-voltage alternating current (AC) waveform is output to a secondary side.

The high-voltage AC waveform is converted into a direct current (DC) high voltage by diode rectification and is applied to a load terminal 330. An environment surrounding the constant current load terminal 330 is recognizable according to a voltage level applied to the load terminal 330.

The voltage level of the load terminal 330 is transmitted to the controller 230, and the controller 230 determines the environment surrounding the load terminal 330 by comparing the voltage level with pre-stored reference values, and supplies the voltage in the constant voltage control method or the constant current control method, whichever is suitable for the determined environment.

At this time, the voltage control method is selected according to the environment condition defined by the pre-stored reference value, which is subject to a user's modification. In other words, same environment condition may be described as a low temperature and low humidity, room temperature, or a high temperature and high humidity by modifying the pre-stored reference value.

Figure 4:
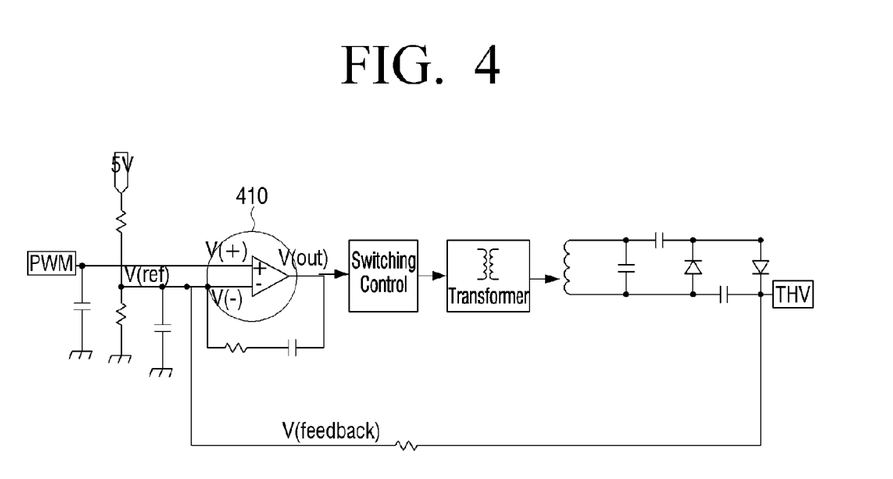
FIG. 4 is a circuit diagram to describe feedback operation of a constant voltage feedback unit according to an exemplary embodiment of the present general inventive concept.

FIG. 4 is a circuit diagram to describe feedback operation of the constant voltage feedback unit 213 according to an exemplary embodiment of the present general inventive concept.

A voltage converted after passing through a low pass filter, as illustrated in FIG. 3, is input to a V(+) terminal of a comparator 410, and a reference voltage and a feedback voltage are input to a V(−) terminal.

When V(+) of the comparator 410 is greater than V(−), it indicates that a voltage applied to the load terminal 330 is less than a proper voltage so that an output value of the comparator 410 becomes low, and when V(+) of the comparator 410 is less than V(−), an output value of the comparator 410 becomes high.

Consequently, in order to make a voltage applied to the V(+) terminal of the comparator 410 equal to a voltage applied to the V(−) terminal, a voltage applied to the load terminal 330 is controlled and thus a feedback voltage is adjusted.

For example, when a constant high voltage is set to apply to the load terminal 330, a voltage actually applied to the load terminal 330 may become low due to a lowered load value according to an environment condition, such as a high temperature and high humidity, a room temperature, or a low temperature and low humidity, surrounding the load terminal 330, and thus, a feedback voltage also becomes low.

Accordingly, since a voltage applied to the V(+) terminal of the comparator 410 becomes greater than a voltage applied to the V(−) terminal, an output value of the comparator 410 becomes high, thereby compensating to apply a constant voltage to the load terminal.

The operation of the constant current feedback unit 215 may be implemented in a similar manner.

Figure 5:
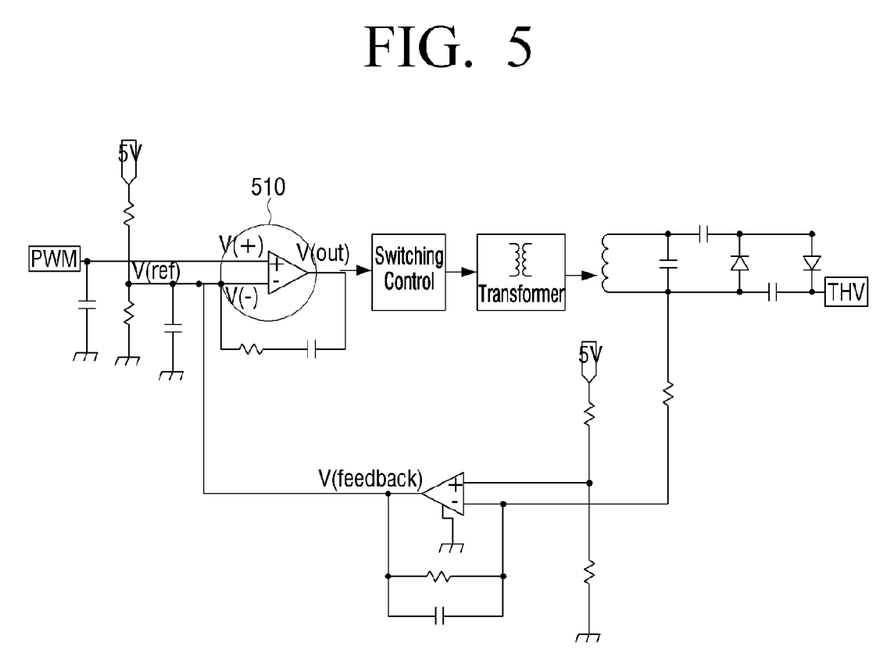
FIG. 5 illustrates a circuit diagram to describe feedback operation of a constant current feedback unit according to an exemplary embodiment of the present general inventive concept.

FIG. 5 is a circuit diagram to describe feedback operation of the constant current feedback unit 215 according to an exemplary embodiment of the present general inventive concept.

Since basic operation of the constant current feedback unit 215 is the same as that of the constant voltage feedback unit 213, description is not repeated.

When a constant high voltage is set to apply to the load terminal 330, a voltage actually applied to the load terminal 330 may become low due to a lowered load value according to an environment condition, such as a high temperature and high humidity, a room temperature, a low temperature and low humidity, surrounding the load terminal 330, causing an electrical current running through the load terminal 330 to become high, and thus a feedback voltage also becomes high.

Consequently, since a voltage applied to a V(−) terminal of a comparator 510 becomes greater than a voltage applied to a V(+) terminal, an output value of the comparator 510 becomes low so that a constant current may pass through the load terminal 330.

Figure 6:
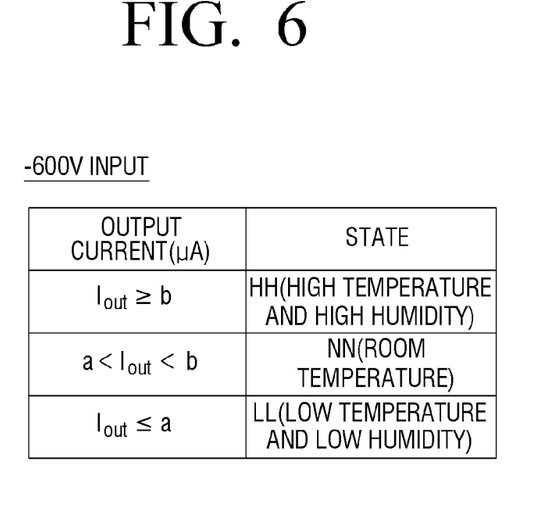
FIG. 6 illustrates a mapping table to determine state information of an image former according to an exemplary embodiment of the present general inventive concept.

FIG. 6 illustrates a mapping table to determine state information of an image former 220 according to an exemplary embodiment of the present general inventive concept.

In order to determine the state of the image former 220, the controller 230 may control the power supplier 210 to output an initial constant voltage or constant current, and may determine the state of the image former 220 based on an output voltage or an output current that is measured in the image former 220 accordingly.

A load value of the image former 220 may change according to a temperature or humidity of an environment surrounding the image former 220.

Accordingly, although a constant voltage or a constant current of an output level is set by the voltage level setter 211 of the power supplier 210 to supply the image former 220, an actually measured value of the constant voltage or constant current in the image former 220 may be different.

A storage (not illustrated) of the image forming apparatus 200 may pre-store a mapping table to determine state information of the image former 220 by comparing the measured electrical current value or the voltage value in the image former 220 with the pre-set initial constant current or the initial constant voltage, respectively.

Referring to FIG. 6, the initial constant voltage is −600V, and the state information of the image former 220 is determined to be one of a high temperature and high humidity (HH), room temperature (NN), and a low temperature and low humidity (LL) by measuring the actual electrical current of the image former 220.

Specifically, when the electrical current measured in the image former 220 is greater than "b μA," the controller 230 determines that the image former 220 lies in an environment with a high temperature and high humidity.

Accordingly, the controller 230 controls the power supplier 210 to output a constant voltage in the constant voltage control method suitable for the environment with a high temperature and high humidity, and controls the switch 217 to connect the constant voltage feedback 213 with the voltage level setter 211.

When an electrical current measured in the image former 220 is less than "a μA," the controller 230 determines that the image former 220 lies in an environment with a low temperature and low humidity, and controls the power supplier 210 to output a constant current in the constant current control method.

Figure 7:
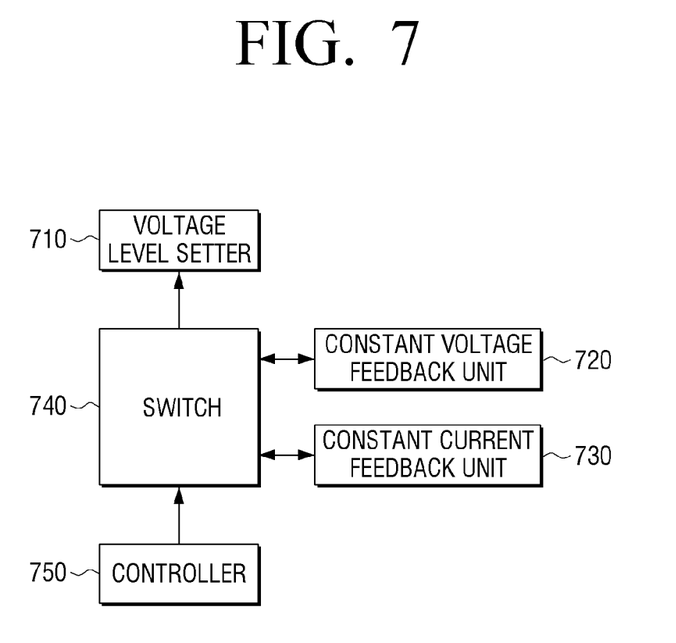
FIG. 7 is a block diagram of a power supplier according to an exemplary embodiment of the present general inventive concept.

FIG. 7 is a block diagram of a power supply apparatus 700 according to an exemplary embodiment of the present general inventive concept.

The power supply apparatus 700 may include a voltage level setter 710, a constant voltage feedback unit 720, a constant current feedback unit 730, a switch 740, and a controller 750.

The voltage level setter 710 determines an output level of a constant voltage or a constant current according to an external signal. The external signal may be a pulse width modulation (PWM) control signal.

More specifically, the voltage level setter 710 outputs a specific electrical current or voltage according to a PWM input duty, and applies a constant voltage or a constant current although a load value of a load terminal 330 changes by the constant voltage feedback unit 720 or the constant current feedback unit 730, respectively.

In order to output a constant voltage of an output level set by the voltage level setter 710 to the load terminal 330, the constant voltage feedback unit 720 corrects an output value of the voltage level setter 710. A method of correcting the output value of the voltage level setter 710 is performed in the same manner as described with reference to FIG. 4.

In order to output a constant current of an output level determined by the voltage level setter 710 to the load terminal 330, the constant current feedback unit 730 corrects an output value of the voltage level setter 710. A method of correcting the output value of the voltage level setter 710 is performed in the same manner as described with reference to FIG. 5.

The switch 740 connects the voltage level setter 710 with the constant voltage feedback unit 720 or the constant current feedback unit 730 selectively.

In other words, the controller 750 figures out state information of the load terminal 330, determines to supply a high voltage to the load terminal 330 in the constant voltage control method or the constant current control method, and controls the switch 740 to connect a corresponding feedback unit with the voltage level setter 710.

For example, when it is determined that the state of the load terminal 330 is at a high temperature and high humidity, the constant voltage control method is more advantageous. Accordingly, the controller 750 controls the switch 740 to connect the constant voltage feedback unit 720 with the voltage level setter 710 so that a constant voltage may be supplied to the load terminal.

The state of the load terminal 330 may be determined using the mapping table illustrated in FIG. 6.

Figure 8:
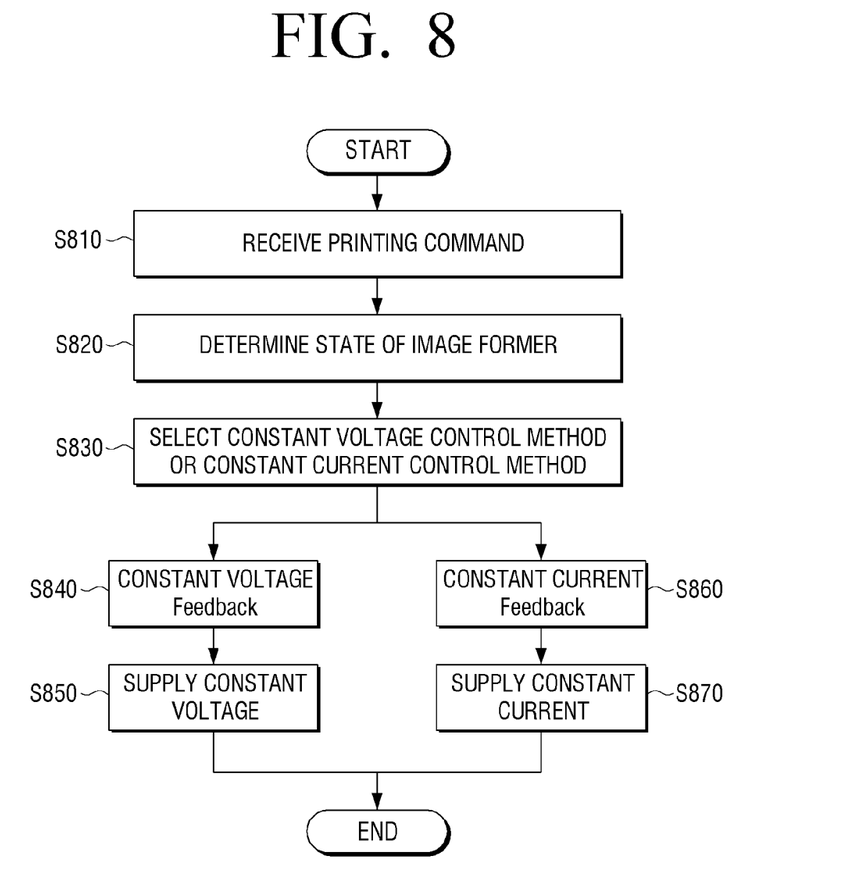
FIG. 8 is a flow chart of a power supply method of an image forming apparatus according to an exemplary embodiment of the present general inventive concept.

FIG. 8 is a flow chart of a power supply method of an image forming apparatus 200 according to an exemplary embodiment of the present general inventive concept.

The image forming apparatus 200 externally receives print data through a printing command (S810), and determines state information of the image former 220 (S820). More specifically, the image forming apparatus 200 applies an initial voltage or an initial electrical current to the image former 220, measures a voltage or an electric current of the image former 220, and determines the state information of the image former 220 using a pre-stored mapping table.

Subsequently, whether to select the constant voltage control method or the constant current control method is determined according to the state information of the image former 220 (S830).

When it is determined that the image former 220 lies in an environment with a high temperature and high humidity, the constant voltage control method is selected, the switch 217 is controlled to connect the constant voltage feedback unit 213 with the power supplier 210 (S840), and a high voltage to drive the image former 220 is applied in the constant voltage control method (S850).

When it is determined that the image former 220 lies in an environment with a low temperature and low humidity, the constant current control method is selected, the switch 217 is controlled to connect the constant current feedback unit 215 with the power supplier 210 (S860), and a high voltage to drive the image former 220 is applied in the constant current control method (S870).

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply apparatus capable of outputting a predetermined voltage or a predetermined electrical current selectively, the power supply apparatus comprising:
a voltage level setter to determine an output level of a voltage or an electrical current according to an external signal;
a constant voltage feedback unit to correct an output value of the voltage level setter so as to output a constant voltage of the output level to a load terminal;
a constant current feedback unit to maintain the external signal constantly and correct an output value of the voltage level setter so as to output a constant current of the output level to the load terminal;
a switch to connect the voltage level setter with the constant voltage feedback unit or the constant current feedback unit selectively; and
a controller to control the switch to output the constant voltage or the constant current selectively according to a state of the load terminal,
wherein the constant voltage feedback unit is electrically connected between a first side terminal of the load terminal from which an input current is output and the switch, and the constant current feedback unit is electrically connected between a second side terminal of the load terminal to which a current is input and the switch, and
wherein the controller selects the constant voltage feedback unit or the constant current feedback unit for controlling the switch.

2. The power supply apparatus as claimed in claim 1, further comprising:
a storage to store a mapping table including state information of the load terminal corresponding to size of a voltage or an electrical current which is output to the load terminal when a predetermined external signal is input.

3. The power supply apparatus as claimed in claim 2, wherein the controller determines the state information of the load terminal based on the mapping table, and outputs the constant current or the constant voltage to the load terminal according to the state information of the load terminal.

4. The power supply apparatus as claimed in claim 1, wherein the voltage level setter comprises a comparator to determine the output level by comparing an input voltage consistent with the external signal and a reference voltage.

5. The power supply apparatus as claimed in claim 4, wherein the constant voltage feedback unit corrects the output value of the voltage level setter by changing a feedback voltage input to the comparator.

6. The power supply apparatus as claimed in claim 4, wherein the constant current feedback unit maintains the input voltage consistent with the external signal, and corrects the output value of the voltage level setter by changing a feedback voltage input to the comparator.

7. The power supply apparatus as claimed in claim 1, wherein the external signal is a pulse width modulation (PWM) control signal.

8. An image forming apparatus comprising:
a power supplier;
an image former to form an image; and
a controller to control the power supplier to supply a predetermined voltage or a predetermined electric current to the image former according to a state of the image former,
wherein the power supplier comprises:
a voltage level setter to determine an output level of a constant voltage or a constant current according to an external signal;
a constant voltage feedback unit to correct an output value of the voltage level setter so as to output a constant voltage of the output level to a load terminal and the image former;
a constant current feedback unit to maintain the external signal constantly and correct an output value of the voltage level setter so as to output a constant current of the output level to the load terminal and the image former; and
a switch to connect the voltage level setter with the constant voltage feedback unit or the constant current feedback unit selectively
wherein the constant voltage feedback unit is electrically connected between a first side terminal of the load terminal which an input current is output and the switch, and the constant current feedback unit is electrically connected between a second side terminal of the load terminal which a current is input and the switch, and
wherein the controller selects the constant voltage feedback unit or the constant current feedback unit for controlling the switch.

9. The image forming apparatus as claimed in claim 8, further comprising:
a storage to store a mapping table including state information of the image former corresponding to a voltage or an electrical current which is output to the image former when a predetermined external signal is input.

10. The image forming apparatus as claimed in claim 9, wherein the controller determines the state information of the image former based on the mapping table, and outputs the constant current or the constant voltage to the image former according to the state information of the image former.

11. The image forming apparatus as claimed in claim 8, wherein the voltage level setter comprises a comparator to determine the output level by comparing an input voltage consistent with the external signal and a reference voltage.

12. The image forming apparatus as claimed in claim 11, wherein the constant voltage feedback unit corrects the output value of the voltage level setter by changing a feedback voltage input to the comparator.

13. The image forming apparatus as claimed in claim 12, wherein the constant current feedback unit maintains the input voltage consistent with the external signal, and corrects the output value of the voltage level setter by changing a feedback voltage input to the comparator.

14. The image forming apparatus as claimed in claim 8, wherein the image former comprises:
an organic photoconducting cartridge (OPC);
a charge roller to charge the OPC with negative charges; and
a transfer roller to transfer toner stuck to the OPC onto paper, and the constant voltage or the constant current is applied to the charge roller or the transfer roller.

15. The image forming apparatus as claimed in claim 8, wherein the state of the image former is one of a first state of an environment higher than a predetermined temperature and humidity, a second state of an environment lower than the predetermined temperature and humidity, and a third state of an environment same as the predetermined temperature and humidity.

16. The image forming apparatus as claimed in claim 8, wherein the external signal is a pulse width modulation (PWM) control signal.

17. A power supply apparatus, comprising:
a voltage setter to determine an output level of a voltage of an electrical current according to an external signal;
a constant voltage feedback circuit to apply a constant voltage to a load terminal based on a feedback voltage of the constant voltage feedback circuit;
a constant current feedback unit to apply a constant current to the load terminal based on a feedback voltage of the constant current feedback unit; and
a controller to selectively connect the voltage settler to one of the constant voltage feedback unit and the constant current feedback unit based on environmental conditions surrounding the load terminal,
wherein the constant voltage feedback unit is electrically connected between a first side terminal of the load terminal which an input current is output and the switch, and the constant current feedback unit is electrically connected between a second side terminal of the load terminal which a current is input and the switch, and
wherein the controller selects the constant voltage feedback unit or the constant current feedback unit for controlling the switch.

18. The power supply apparatus of claim 17, wherein the environmental conditions include one of a first environment condition and a second environment condition according to a comparison of a measured voltage level of the load terminal and a reference voltage.

19. The power supply apparatus of claim 18, wherein when the measured voltage level of the load terminal is higher than the reference voltage, the environmental conditions include the first environment condition under which the controller connects the constant voltage feedback unit to the load terminal.

20. The power supply apparatus of claim 18, wherein when the measured voltage level of the load terminal is lower than the reference voltage, the environmental conditions include the second environment condition under which the controller connects the constant current feedback unit to the load terminal.

21. The power supply apparatus of claim 18, wherein the first and the second environment conditions are different in temperature and humidity surrounding the load terminal.

22. A method of supplying a predetermined constant voltage or a predetermined constant current from a power supplier to an image former of an image forming apparatus, comprising:
receiving a print command;
determining a state of the image former upon receiving the print command;
selectively applying one of constant voltage control and constant current control depending on the state of the image former by controlling a switch of the power supplier;
performing feedback control according to a level of constant voltage or a level of constant current measured in the image former corresponding to the selective application; and
supplying a constant voltage of a constant voltage feedback unit electrically connected between the switch and a first side terminal of a load terminal which an input current is output or a constant current of a constant current feedback unit back electrically connected between the switch and a second side terminal of the load terminal which a current is input according to the feedback control.

23. The method of claim 22, the state of image former is determined by comparing voltage levels of a load terminal of the power supplier with pre-stored reference values.

24. The method of claim 23, wherein the state of the image former is one of a first state corresponding to a first environment condition and a second state corresponding to a second environment condition surrounding the load terminal according to the comparison.

25. The method of claim 24, wherein the first and the second environment conditions are different in temperature and humidity surrounding the load terminal.

26. The method of claim 22, wherein the feedback control corrects an output voltage based on a comparison between the output voltage and a feedback voltage.

27. The method of claim 26, wherein the feedback control according to a level of constant voltage is performed separately from the feedback control according to a level of constant current.

28. The method of claim 27, wherein the feedback control according to a level of constant voltage and the feedback control according to a level of constant current is switchable between each other.

29. The method of claim 22, further comprises setting a level of constant voltage or constant current by a voltage level setter of the power supplier according to an external signal.

* * * * *